Nov. 17, 1953     W. E. SAXE     2,659,563
AUTOMATIC DISPENSING MECHANISM
Filed March 22, 1948     3 Sheets—Sheet 1
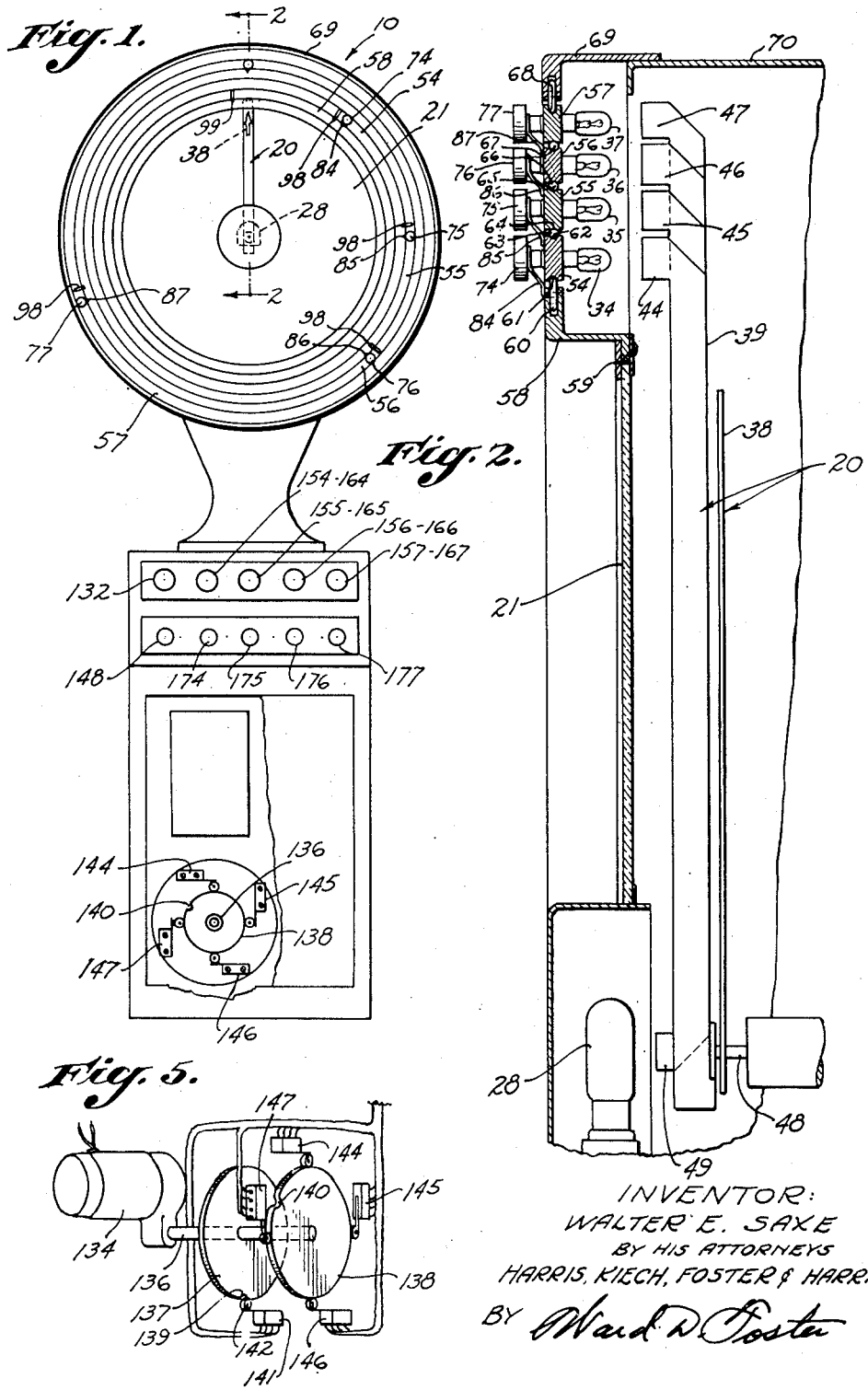
INVENTOR:
WALTER E. SAXE
BY HIS ATTORNEYS
HARRIS, KIECH, FOSTER & HARRIS,
BY Ward D. Foster Nov. 17, 1953 W. E. SAXE 2,659,563
AUTOMATIC DISPENSING MECHANISM
Filed March 22, 1948 3 Sheets-Sheet 2
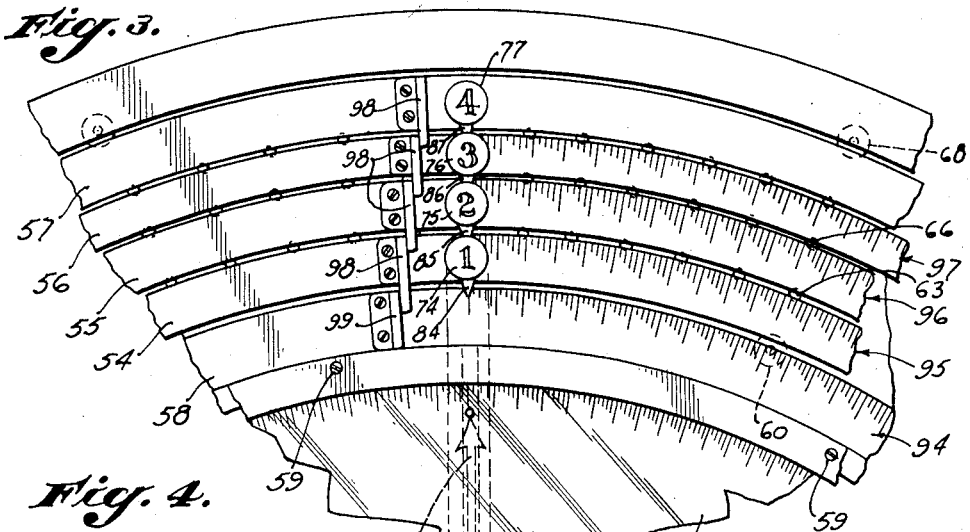
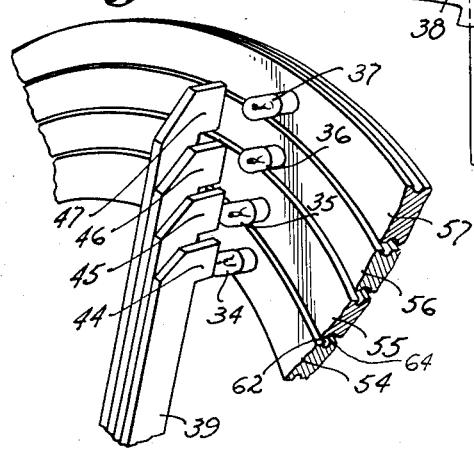
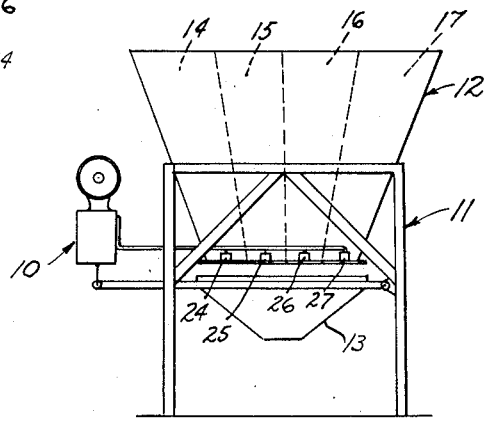
INVENTOR:
WALTER E. SAXE,
BY HIS ATTORNEYS
HARRIS, KIECH, FOSTER & HARRIS

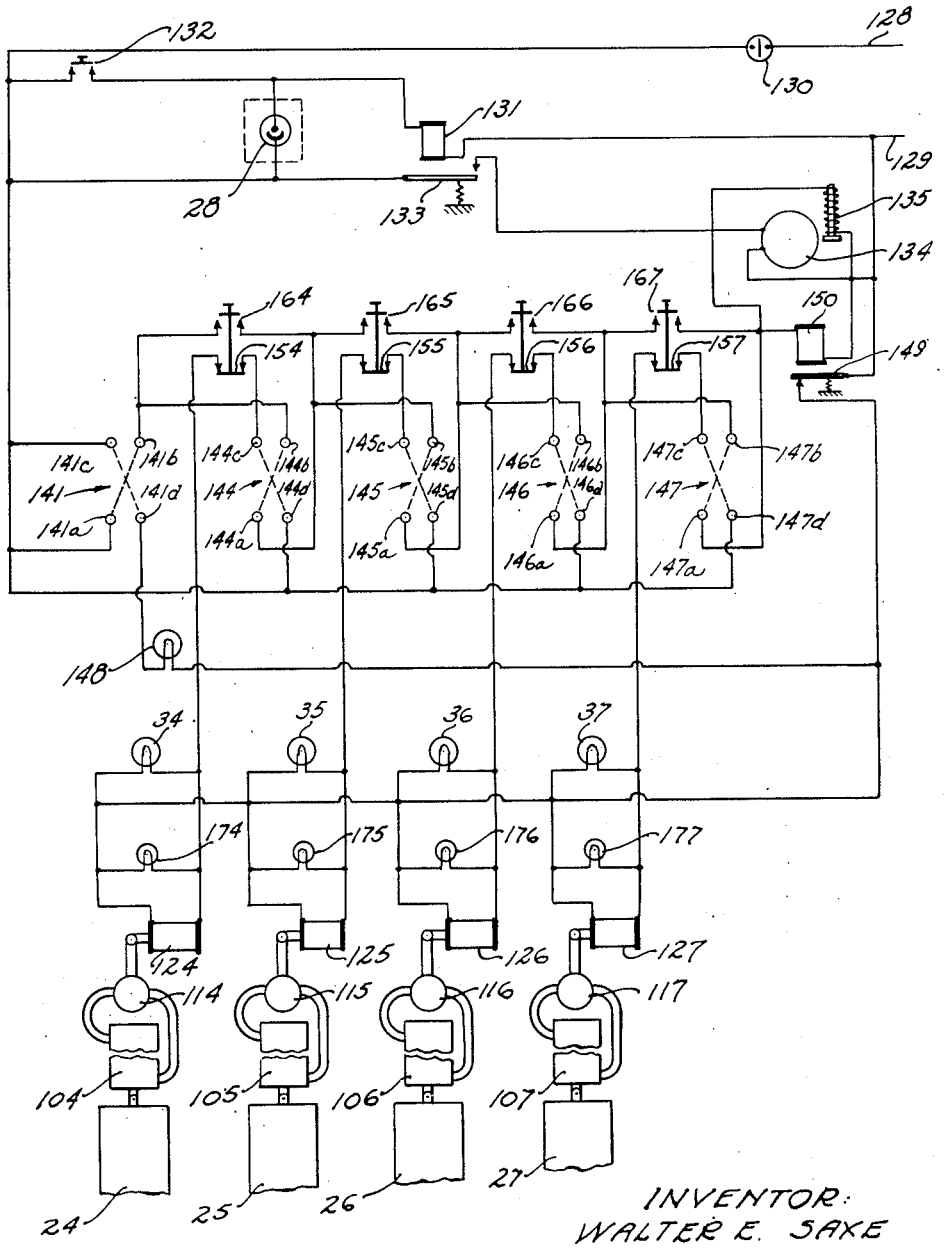

Patented Nov. 17, 1953

2,659,563

UNITED STATES PATENT OFFICE 2,659,563

AUTOMATIC DISPENSING MECHANISM

Walter E. Saxe, San Gabriel, Calif., assignor to The Conveyor Company, Inc., Los Angeles, Calif., a corporation of California Application March 22, 1948, Serial No. 16,251

22 Claims. (Cl. 249—14)

My invention relates in general to mechanisms for dispensing materials in measured quantities and, more particularly, to an apparatus for producing mixtures of predetermined proportions.

More particularly, my invention relates to an apparatus incorporating improvements on the apparatus disclosed in my prior application Serial No. 771,013, filed August 28, 1947, now Patent No. 2,625,301, dated January 13, 1953, and entitled "Automatic Dispensing Apparatus." Reference is also made to my application Serial No. 16,252, filed March 22, 1948, now Patent No. 2,625,300, dated January 13, 1953, and entitled "Automatic Dispensing Machine."

In general, it is an object of the invention to provide an apparatus for actuating a plurality of dispensing devices in such a manner that each device dispenses a measured quantity of material from a source with which it is associated. More specifically, it is an object of the invention to provide an apparatus for actuating the dispensing devices under the control of means responsive to the quantities of material dispensed by the devices.

As an example, an apparatus embodying the fundamental principles of my invention may be employed in connection with an installation wherein the sources of material referred to in the preceding paragraph are storage bins and the dispensing devices are gates or other discharge controlling devices. Such installations, an example of which may be found in my Patent No. 2,336,130, issued December 7, 1943, are used extensively for combining the constituents of such materials as concrete, for example, although other uses therefor are well known to those skilled in the art.

Since the invention is particularly applicable to and was originally embodied in a dispensing apparatus which is responsive to the weights of the materials dispensed thereby, I prefer to consider such an embodiment herein for purposes of illustration. However, the invention may be embodied in apparatus responsive to variables other than the weights of the dispensed materials and it will be understood, therefore, that I do not desire to be limited to the particular embodiment which I have elected to disclose herein. For example, as will be apparent to those skilled in the art, various features of the invention may be incorporated in an apparatus which is responsive to such parameters of the dispensed materials as their volumes, pressures, levels in a container, etc.

Considering the nature of the invention in more detail, it is a primary object to provide an apparatus having a plurality of material dispensing devices and having photoelectrically controlled means responsive to the quantities of material dispensed by the respective devices for actuating and subsequently de-actuating the devices in sequence in such a manner that each device dispenses a predetermined quantity of material from a source with which it is associated. More specifically, an object in this connection is to provide an apparatus having means for actuating the dispensing devices in sequence and having photoelectric means for de-actuating each device whenever a predetermined quantity of material has been dispensed thereby.

An important object of the invention is to provide an apparatus having means whereby the quantities of material to be dispensed by the various dispensing devices may be varied readily.

More specifically, an object of the invention is to provide an apparatus having a control member or arm which is movable through distances proportional to the quantities of material dispensed by the dispensing devices, and having a plurality of control devices which are shiftable along the path of the control arm and which are adapted to cooperate therewith to control the operation of the dispensing devices in such a manner as to dispense predetermined quantities of the materials. An important object in this connection is to provide means whereby the control devices may be shifted along the path of the control arm readily when the quantities of material to be dispensed by the dispensing devices are to be varied.

Another object of the invention is to provide an apparatus wherein the control devices are light sources which, in cooperation with the movable control arm, regulate the photoelectrically controlled means for actuating and de-actuating the dispensing devices.

A further object is to provide an apparatus of the foregoing character wherein the control arm is adapted to convey light from the various light sources to a single, stationary photoelectric cell, the control arm being non-linear and being formed of a material which is capable of conveying light along an irregular path.

Still another object of the invention is to provide an apparatus wherein the light sources are carried by concentric annular members which are rotatable about a common axis. A related object is to provide an apparatus wherein the annular members are of progressively greater diameters and are nested together so that the innermost annular member carries the remaining annular members.

Another important object of the invention is to provide an apparatus of the character set forth in the preceding paragraph wherein each of the annular members is provided with a pointer or other indicium thereon which is movable over a circular scale corresponding to a particular dispensing device so that the quantity of material to be dispensed by such device may be selected readily. A related object is to provide an apparatus wherein the scale along which the pointer carried by the innermost annular member moves is stationary, and wherein the scales along which the pointers carried by the remaining annular members move are rotatable so that zero indicia on the scales may be shifted with respect to each other. Another object in this connection is to provide an apparatus wherein the rotatable scales are carried by various of the rotatable annular members.

A further object of the present invention is to provide an apparatus wherein the control arm for conducting light from the various light sources to the photoelectric cell is provided at its outer end with a plurality of fingers which are adapted to register with the light sources carried by the respective annular members.

The foregoing objects of my invention and the advantages suggested thereby, together with various other objects and advantages which will become evident, may be attained through the employment of the exemplary embodiment of the invention which is illustrated in the accompanying drawings and which is described in detail hereinafter.

Referring to the drawings:

Fig. 1 is a front elevational view of a dispensing mechanism which embodies the invention;

Fig. 2 is an enlarged, fragmentary sectional view taken along the broken line 2—2 of Fig. 1;

Fig. 3 is a enlarged, fragmentary front elevational view showing the aforementioned concentric annular members which form part of the dispensing mechanism;

Fig. 4 is an enlarged, fragmentary perspective view showing the aforementioned annular members, light sources and fingered control arm all of which form part of my dispensing apparatus;

Fig. 5 is a perspective view showing a switch operating means of the invention;

Fig. 6 is schematic diagram showing an electrical circuit which forms part of the dispensing apparatus; and Fig. 7 is a view on a reduced scale showing, in semi-diagrammatic form, an installation in which my dispensing apparatus may be incorporated.

Referring first to Fig. 7 of the drawings, I show an installation in which my dispensing apparatus, indicated generally by the numeral 10, may be incorporated particularly advantageously. This installation includes a frame 11 which carries a hopper 12 and a receiver or receptacle 13, the hopper being divided into four storage compartments or bins 14, 15, 16 and 17 in the particular construction illustrated so that four different materials may be discharged into the receiver. It will be understood, of course, that the number of materials to be handled may be varied as desired, the number four having been selected merely for purposes of illustration.

The installation shown in Fig. 7 of the drawings may, for example, be employed for combining the various constituents of concrete, in which case the bins 14 to 17 may contain cement and various grades of aggregates such as sand, gravel, crushed rock, etc. The materials delivered into the receiver 13 subsequently may be discharged therefrom into a concrete mixer (not shown), the frame 11 supporting the hopper 12 and receiver 13 preferably being so designed that a truck (not shown) carrying a concrete mixer may be driven beneath the receiver so that the mixture contained therein may be discharged into the mixer as is well known in the art.

Referring particularly to Fig. 1 of the drawings, the dispensing apparatus 10, in the particular construction illustrated, includes a scale which is connected to the receiver 13 in a manner not specifically shown but well known in the art so as to produce movement of an indicator 20 over a scale dial 21 in response to variations in the weight of the mixture contained in the receiver. As will be discussed in detail hereinafter, such weight variations are utilized to control the operation of dispensing devices which regulate the delivery of material from the bins 14 to 17 into the receiver 13, such dispensing devices being shown schematically in Fig. 6 and being indicated by the numerals 24, 25, 26 and 27. These dispensing devices, which are exemplified as simple gates, may be of any suitable type and may be of the type disclosed in my aforesaid prior patent if desired.

Considering the dispensing apparatus 10 in more detail, the dispensing devices 24 to 27 are actuated in sequence by a photoelectrically controlled means whose operation is regulated by the position of the indicator 20 relative to the scale dial 21 in such a manner that the dispensing devices deliver predetermined quantities of the materials contained in the bins 14 to 17 into the receiver 13 in sequence. As best shown in Fig. 2 of the drawings, the photoelectrically controlled means includes a photoelectric cell 28 which is mounted at the center of the scale dial 21 and which is adapted to receive light in sequence from a plurality of light sources as the indicator 20 moves around the dial, the light sources serving as control devices which determine the quantities of material to be dispensed by the dispensing devices 24 to 27. These light sources, which are shown as four in number to correspond to the four dispensing devices 24 to 27, are identified by the numerals 34, 35, 36 and 37, each light source preferably being an electric light bulb. As will be discussed in more detail hereinafter, the light sources 34 to 37 may be shifted circumferentially of the scale dial 21 to vary the quantities of material to be dispensed by the corresponding dispensing devices 24 to 27.

As best shown in Fig. 2 of the drawings, the indicator 20 includes a pointer 38 which is movable over the scale dial 21, and includes a control arm 39, the indicator being rotatable about the axis of the circular scale dial 21 so that the pointer 38 and control arm 39 move around the scale dial as material is delivered into the receiver 13. The control arm 39 is formed of a material which has the characteristic of conducting light along a non-linear path, e. g., "Lucite" (methyl methacrylate), and is provided at its outer end with fingers 44, 45, 46 and 47 which are adapted to register with the light sources 34, 35, 36 and 37, respectively, so that light from the light sources is conducted through the control arm to the inner end thereof as the various fingers register with the corresponding light sources. The indicator 20 is carried by a spindle 48 and the control arm 39 terminates at its inner end in an axially extending shank 49 which registers with the photoelectric cell 28 so that light from the light sources 34 to 37 which passes through the control arm is caused to fall upon the photoelectric cell. Thus, it will be apparent that as the indicator 20 moves around the scale dial 21, light from the light sources is transmitted to the photoelectric cell 28 by the control arm 39.

When the dispensing apparatus 10 is in operation, the light source 34 is spaced from the zero point on the scale dial 21 a distance proportional to the weight of the material to be discharged from the bin 14 by the dispensing device 24. The light source 35 is spaced from the light source 34 a distance proportional to the weight of the material to be discharged from the bin 15 into the receiver 13 by the dispensing device 25. Similarly, the light sources 36 and 37 are spaced from the light sources 35 and 36, respectively, distances proportional to the weight of the material to be discharged from the bins 16 and 17, respectively, by the dispensing devices 26 and 27. Thus, as will be discussed in more detail hereinafter, material is discharged from the bin 14 during the interval that the indicator 20 moves from the zero point on the scale dial 21 to the light source 34, material is discharged from the bin 15 during the interval that the indicator moves from the light source 34 to the light source 35, etc.

In order to permit varying the weights of the materials to be delivered from the bins 14 to 17 into the receiver 13 by the respective dispensing devices 24 to 27, the light sources 34 to 37 are shiftable along the paths of the ends of the respective fingers 44 to 47 at the outer end of the control arm 39 in a manner about to be described. As best shown in Figs. 2, 3 and 4 of the drawings, the light sources 34 to 37 are carried by annular members or rings 54 to 57, respectively, which are concentric with the path of the indicator 20 and which are rotatable about the axis of rotation thereof to move the light sources to different points along the scale dial 21. The rings 54 to 57 are of progressively greater diameters and are nested together, as best shown in Fig. 4 of the drawings. The innermost ring, viz., the ring 54, encircles and is carried by a stationary annular member 58 which is mounted on the scale dial 21 by means of screws 59, or the like, the member 58 being provided with rollers 60 which extend into a groove 61 in the inner circumferential wall of the ring 54 to support this ring and permit rotation thereof relative to the member 58. The inner ring 54 is provided with a groove 62 in its outer peripheral wall for ball bearings 63 which extend into a groove 64 in the inner peripheral wall of the second ring 55 to support this ring and permit rotation thereof relative to the inner ring 54. Similarly, the third ring 56 is carried by the second ring 55 and is rotatable relative thereto on ball bearings 66 which are disposed in grooves respectively formed in the outer circumferential wall of the ring 55 and the inner circumferential wall of the ring 66. The outer ring 57 is rotatable on ball bearings 67 which are disposed in annular grooves respectively formed in the outer circumferential wall of the ring 56 and the inner circumferential wall of the ring 57, the outer ring 57 also being rotatable on rollers 68 which extend into an annular groove formed in the outer peripheral wall thereof. The rollers 68 are carried by an annular rim 69 which is carried by a housing 70 that encircles the scale dial 21.

It will thus be apparent that the rings 54 to 57 may be rotated relative to the stationary annular member 58 and relative to each other to vary the positions of the light sources 34 to 37 with respect to the scale dial 21 so that the quantities of the materials in the bins 14 to 17 which are to be dispensed may be varied. As best shown in Fig. 3 of the drawings, the rings 54 to 57 are provided with handles 74 to 77, respectively, thereon by means of which the rings may be rotated into the desired positions.

As best shown in Fig. 2 of the drawings, the handles 74 to 77, which are preferably knobs, carry pointers 84 to 87, respectively, which are movable along circular scales 94 to 97, respectively, the scale 94 being defined by indicia on the stationary annular member 58, and the scales 95, 96 and 97 being defined by indicia on the rings 54, 55 and 56, respectively. As will be apparent, the rings 54 to 57 may be rotated until the pointers 84 to 87 thereon register with any desired indicia on the respective scales 94 to 97.

The indicia on the respective scales 94 to 97 correspond to the quantities of the materials to be dispensed from the bins 14 to 17 and each scale begins at zero so that the pointers 84 to 87 may be set opposite indicia on the respective scales 94 to 97 which correspond to the quantities of materials to be dispensed by the respective dispensing devices 24 to 27. As an example, if fifty pounds of the material in the bin 14, one hundred pounds of the material in the bin 15, etc. are to be dispensed, the ring 54 is rotated until the pointer 84 registers with the indicium "50" on the scale 94, the ring 55 is rotated until the pointer 85 thereon registers with the indicium "100" on the scale 95, etc., thus shifting the light sources 34, 35, etc. into the proper positions.

As best shown in Fig. 3 of the drawings, each of the rings 54 to 57 is provided with a stop 98 thereon. The stops 98 are adapted to interlock and the stop 98 on the innermost ring 54 is adapted to engage a stop 99 on the stationary annular member 58 to limit rotation of the rings in the counterclockwise direction, as viewed in Fig. 3. Preferably, the stops 98 and 99 are so positioned that the zero points on the scales 95, 96 and 97 and the pointers 84 to 87 will all be aligned with the zero point on the scale 94 and the zero point on the scale dial 21 when all of the rings 54 to 57 have been rotated to the limit of their movement in the counterclockwise direction, as viewed in Fig. 3.

The light sources 34 to 37 carried by the rings 54 to 57 may be connected to a suitable source of electricity in any desired manner, one suitable system for supplying current to the light sources being disclosed in my aforementioned application Serial No. 771,013. However, it will be understood that other systems for supplying current to the light sources, such as a brush system, for example, may be employed.

For convenience, the disclosure thus far has been restricted to a description of the structure of the dispensing apparatus 10 as a preamble to describing the photoelectrically controlled means for actuating the dispensing devices 24 to 27 so as to discharge measured quantities of the materials in the bins 14 to 17 into the receiver 13 in sequence in the manner indicated previously. The photoelectrically controlled means will now be considered in more detail with particular reference to the schematic diagram in Fig. 6 of the drawings.

Referring particularly to Fig. 6, I have shown the dispensing devices 24 to 27 as being actuable by double-acting hydraulic units 104 to 107, respectively, which are controlled by suitable selector valves 114 to 117, respectively, the respective valves being in turn controlled by solenoids 124 to 127 which form part of the electrical circuit of the dispensing apparatus. Considering the circuit in more detail, it includes a pair of leads 128 and 129 which are connected to a suitable current source, the lead 128 being connected to an on-off switch 130 which is closed when the apparatus is in operation. The circuit also includes a relay 131 which is controlled by a start switch 132 and by the photoelectric cell 28, which acts as a switch in the circuit, the switch 132 and the photoelectric cell being connected in parallel with each other and being connected in series with the relay. Thus, the relay 131 is energized whenever the start switch 132 is closed, or whenever light from one of the sources 34 to 37 falls on the photoelectric cell 28. For convenience, the amplifier and other apparatus necessarily associated with the photoelectric cell 28 have been omitted from the circuit.

The relay 131, when energized, closes a normally open switch 133 which is connected in series with an electric motor 134, current being supplied to the motor through suitable connections to the leads 128 and 129. A solenoid operated brake 135 is connected across the input leads to the motor 134 and is adapted to prevent coasting of the motor upon opening of the switch 133, the solenoid incorporated in the brake being adapted to disengage the brake when the motor is energized.

Referring to Fig. 5 of the drawings, the motor 134 drives a shaft 136 which carries discs 137 and 138, these discs being provided with notches 139 and 140, respectively. Associated with the disc 137 is a switch 141 which, as shown in Fig. 6, includes contacts 141a, 141b, 141c, and 141d; the contacts 141a and 141b normally being connected but the contacts 141c and 141d being connected and the contacts 141a and 141b being disconnected whenever an actuating roller 142 forming part of the switch 141 enters the notch 139 in the disc 137.

Similar switches 144 to 147, which respectively correspond to the dispensing devices 24 to 27, are mounted adjacent the disc 138 and are provided with rollers which are adapted to enter the notch 140 in this disc. As shown in Fig. 6, the switch 144 is provided with contacts 144a to 144d, the contacts 144a and 144b being connected when the roller of the switch 144 is out of the notch 140 in the disc 138 and the contacts 144c and 144d being connected when the roller is in the notch. Similarly, the switch 145 includes contacts 145a to 145d, the switch 146 includes contacts 146a to 146d and the switch 147 includes contacts 147a to 147d, the a and b contacts of the respective switches being connected whenever the rollers thereof are out of the notch 140 in the disc 138, and the c and d contacts being connected when the rollers are in the notch.

The switches 141 and 144 to 147 are connected in series in such a manner that a current path through the motor 134 is established when all of the rollers which actuate these switches are out of the notches in the discs 137 and 138 so that the a and b contacts of all of the switches are connected. Consequently, it will be apparent that the motor 134 will be energized either when the respective a and b contacts of all of the switches 141 and 144 to 147 are connected, or when the switch 133 is closed by the relay 131. As previously discussed, this relay is energized to close the switch 133 whenever the start switch 132 is closed, or whenever light from one of the sources 34 to 37 reaches the photoelectric cell 28.

The switch 141 is also connected in the circuit in such a manner that when the roller associated therewith enters the notch 139 in the disc 137 to establish a connection between the contacts 141c and 141d, this switch is connected in series with a pilot light 148, which is preferably green. Connected in series with the pilot light 148 is a normally closed switch 149 which is opened by a relay 150 whenever the motor 134 is energized, the relay 150 being connected in parallel with the motor. Thus, when the contacts 141a and 141b of the switch 141 are connected, this switch is connected in series with the switches 144 to 147 and the motor 134 (provided that the respective a and b contacts of all of the switches 144 to 147 are connected), and, when the contacts 141c and 141d of the switch 141 are connected, this switch is connected in series with the pilot light 148 and the switch 149.

The switch 144 is connected in the circuit in such a manner that when the roller associated therewith enters the notch 140 in the disc 138 to connect the contacts 144c and 144d of this switch, a current path through the light source 34 is established, the light source 34 being connected to the contact 144c of the switch 144 through a normally closed switch 154. The switches 145, 146 and 147 are connected in the circuit in a similar manner so that when the respective c and d contacts thereof are connected, current paths through the light sources 35, 36 and 37, respectively, are established. Normally closed switches 155, 156 and 157 which are similar to the switch 154 are included in the circuit, the switch 155 being interposed between the contact 145c of the switch 145 and the light source 35, the switch 156 being interposed between the contact 146c of the switch 146 and the light source 36, and the switch 157 being interposed between the contact 147c of the switch 147 and the light source 37. Normally open switches 164 to 167 are mechanically connected to the normally closed switches 154 to 157, respectively, in such a manner that whenever the switches 164 to 167 are closed, the switches 154 to 157 are open, and vice versa. The switches 164 to 167 are connected in the circuit as shown in Fig. 6 and cooperate with the switches 154 to 157 to perform functions which will be discussed in more detail hereinafter.

The solenoids 124 to 127 which, through the respective valves 114 to 117 and hydraulic units 104 to 107, control the dispensing devices 24 to 27 are connected in parallel with the light sources 34 to 37 so that whenever the c and d contacts of any one of the switches 144 to 147 are connected by entry of the roller associated therewith into the notch 140 of the disc 138, the corresponding one of the solenoids 124 to 127 is also energized to actuate the corresponding one of the dispensing devices 24 to 27.

If desired, indicator lights 174 to 177, which are preferably red, may be connected in parallel with the solenoids 124 to 127, respectively, so that each of these lights will be energized whenever the corresponding solenoid is energized to indicate that the corresponding one of the dispensing devices 24 to 27 has been actuated.

For convenience in considering the operation of the dispensing mechanism 10, the procedure for initiating operation thereof will be related. Knowing the quantities of the various materials which are to be delivered into the receiver 13 from the bins 14 to 17, the operator rotates the rings 54 to 57 by means of the handles 74 to 77 to bring the pointers 84 to 87 into registry with the indicia on the respective scales 94 to 97 which indicate the quantities to be discharged into the receiver 13. This operation positions the light sources 34 to 37 relative to the scale dial 21 so that the distance between the zero point on the dial and the light source 34 is proportional to the quantity of material to be discharged from the bin 14, the distance between the light source 34 and the light source 35 is proportional to the quantity of material to be discharged from the bin 15, the distance between the light source 35 and the light source 36 is proportional to the quantity of material to be discharged from the bin 16, etc.

After the light sources 34 to 37 have been positioned with respect to the scale dial 21, the dispensing apparatus is ready for operation and, in the electrical circuit, the following conditions obtain: the switches 130, 132 and 164 to 167 are open; the switches 154 to 157 are closed; the photoelectric cell 28 and the relay 131 are de-energized so that the switch 133 controlled thereby is open; the relay 150 is de-energized so that the switch 149 is closed; the motor 134 is de-energized; the roller for actuating the switch 141 is in the notch 139 in the disc 137 so that the contacts 141c and 141d of this switch are connected; all of the rollers for actuating the switches 144 to 147 are out of the notch 140 in the disc 138 so that the respective a and b contacts of all of these switches are connected; the light sources 34 to 37 are de-energized; the pilot light 148 is de-energized; the indicator lights 174 to 177 are de-energized; and the solenoids 124 to 127 controlling the dispensing devices 24 to 27 are de-energized so that no material can flow from any of the bins 14 to 17 into the receiver 13.

With the foregoing conditions obtaining, the operator closes the on-off switch 130, which establishes a generally counterclockwise current path from the lead 128 to the contact 141c of the switch 141, through this switch to the contact 141d, and thence through the pilot light 148 and the switch 149 to the lead 129. Thus, the pilot light 148 is energized to indicate that the electrical system of the apparatus is ready for operation.

The operator then closes the start switch 132 momentarily to energize the relay 131, which closes the switch 133, thus energizing the motor 134 and the relay 150. The latter opens the switch 149 to de-energize the pilot light 148, thus indicating that the apparatus is in operation. As the motor 134 is energized, it rotates the discs 137 and 138 in a clockwise direction, as viewed in Fig. 5, so that the roller controlling the switch 141 leaves the notch 139 in the disc 137 to break the connection between the contacts 141c and 141d of this switch and to establish the connection between the contacts 141a and 141b thereof. At this time, all of the rollers controlling the switches 144 to 147 will be out of the notch 140 in the disc 138 so that a current path to the motor is established through the switches 141 and 144 to 147, this current path, as viewed in Fig. 6, extending in a generally counterclockwise direction from the lead 128 through the switches 141 and 144 to 147 in sequence, through the motor, and thence to the lead 129. This current path may be traced through the switches 141 and 144 to 147 in Fig. 6 by going from the contact 141a of the switch 141 to the contact 147a of the switch 147 by way of the contacts 141b, 144b, 144a, 145b, 145a, 146b, 146a, and 147b in sequence. Since this current path is established through the switches 141 and 144 to 147 as soon as the roller controlling the switch 141 leaves the notch 139 in the disc 137, the start switch 132 may be released without de-energizing the motor 134, although this act will de-energize the relay 131 since no light from one of the light sources 34 to 37 has as yet reached the photoelectric cell 28.

The motor 134 continues to rotate the discs 137 and 138 until the roller which controls the switch 144 enters the notch 140 in the disc 138, whereupon the connection between the contacts 144a and 144b of the switch 144 is broken and the connection between the contacts 144c and 144d thereof is established. Thus, the current path to the motor 134 is broken so that the roller controlling the switch 144 remains in the notch 140 in the disc 138. At the same time, the relay 150 is de-energized so that the switch 149 is closed. Thus, a current path is established through the switch 144, the light source 34, the solenoid 124, and the indicator light 174. Thus, the solenoid 124 is energized and actuates the valve 114 controlling the hydraulic unit 104 so as to actuate the dispensing device 24, thereby permitting material from the bin 14 to flow into the receiver 13.

Such flow continues until a quantity of material sufficient to move the control arm 39 to the light source 34 has been discharged into the receiver 13. When this occurs, light from the source 34 passes through the finger 44 and the control arm 39 and reaches the photoelectric cell 28, thus causing the photoelectric cell to establish a current path from the lead 128 through the relay 131 to the lead 129. The relay 131, when energized in this manner, closes the switch 133 to energize the motor 134, whereupon the motor rotates the discs 137 and 138 so that the roller controlling the switch 144 leaves the notch 140 in the disc 138 to break the connection between the contacts 144c and 144d and to make the connection between the contacts 144a and 144b. Also, at the instant light from the source 34 falls on the photoelectric cell 28, the relay 131 is energized to establish a current path through the relay 150 so as to open the switch 149, thus immediately breaking the current path through the light source 34, indicator light 174 and the solenoid 124.

When the solenoid 124 controlling the dispensing device 24 is de-energized in this manner, the dispensing device terminates discharge of material from the bin 14 into the receiver 13. Thus, the foregoing sequence of operations has resulted in the delivery of a predetermined quantity of material from the bin 14 into the receiver 13, this quantity being substantially equal to the reading on the scale 94 opposite the pointer 84.

It will be noted that since the roller controlling the switch 144 leaves the notch 140 in the disc 138 as soon as the motor 134 is energized by the photoelectric cell 28, the connection between the contacts 144c and 144d of this switch is broken to break the current path through the light source 34 so that the photoelectric cell becomes inoperative to de-energize the relay 131 and break the current path to the motor through the switch 133. However, since the connection between the contacts 144a and 144b of the switch 144 has now been re-established, the current path through the switches 141 and 144 to 147 is re-established so that the motor 134 continues to rotate the discs 137 and 138.

Such rotation of the discs 137 and 138 by the motor 134 continues until the roller controlling the switch 145 enters the notch 140 in the disc 138 to break the connection between the contacts 145a and 145b of the switch 145, thus breaking the current path through the motor. At the same time, the connection between the contacts 145c and 145d of the switch 145 is made so that the light source 35, the indicator light 175 and the solenoid 125 controlling the dispensing device 25 are all energized. As a result, material from the bin 15 is permitted to flow into the receiver 13, thus causing the indicator 20 to continue its progress around the scale dial 21. Such movement of the indicator 20 continues until the finger 45 on the control arm 39 registers with the light source 35, whereupon the solenoid 125 controlling the dispensing device 25 is de-energized by opening of the switch 149 as the relay 150 and the motor 134 are energized through the action of the photoelectric cell 28 in energizing the relay 131 to close the switch 133. Thus, a predetermined quantity of the material in the bin 15 will have been discharged into the receiver 13.

The foregoing operational sequences are repeated until predetermined quantities of the materials in the bins 16 and 17 have also been discharged into the receiver 13, and, after all of the materials have been discharged into the receiver 13 in measured quantities, the motor 134 continues to rotate the discs 137 and 138 until the roller controlling the switch 141 enters the notch 139 in the disc 137 to break the connection between the contacts 141a and 141b of this switch, thus breaking the current path through the motor. The conditions now obtaining are identical to those which obtained when the on-off switch 130 was closed to ready the apparatus for operation. In other words, the apparatus is now in a condition for a repetition of the preceding operating cycle.

The discussion thus far has been based on the assumption that predetermined quantities of the materials in all of the bins 14 to 17 are to be discharged into the receiver 13. However, it is frequently desirable to prevent discharge of one of the materials when a mixture having a smaller number of constituents is desired, this being the function of the previously mentioned switches 154 to 157 and 164 to 167.

For convenience in considering the operation of these switches, it will be assumed that the materials from the bins 15, 16 and 17 are to be discharged into the receiver 13 and that the material from the bin 14 is not to be discharged thereinto. In this case, the operator, preferably prior to closing the start switch 132, opens the switch 154 and closes the switch 164. Since the switches 154 and 164 are mechanically interconnected, this is accomplished in a single operation. Opening the switch 154 prevents the establishment of a current path through the solenoid 124 controlling the dispensing device 24 associated with the bin 14 so that no material will be discharged from this bin when the roller controlling the switch 144 enters the notch 140 in the disc 138. The switch 164, being closed, establishes a by-pass current path around the switch 144 so that the motor 134 is not de-energized when the roller controlling the switch 144 enters the notch 140, the current path through the motor under such conditions being through the switch 141, the switch 164, and the switches 145, 146 and 147. Discharge of material from any one of the remaining bins, i. e., 15, 16 and 17, may be prevented by the paired switches 155—165, 156—166 and 157—167 in a similar manner. It will be noted that if material from only one of the bins 14 to 17 is desired, it is merely necessary to actuate all of the combinations 154—164, 155—165, 156—166 and 157—167 except the one corresponding to the bin from which the material is desired.

It will be understood that appropriate settings of the rings 54 to 57 must be employed if one of the materials is to be omitted. For example, if material from the bin 15 is to be omitted without varying the quantities of the materials to be dispensed from the remaining bins, the rings 55, 56 and 57 must be rotated relative to the ring 54 so that the pointer 85 on the ring 55 registers with the zero point on the scale 95.

It will thus be apparent that I have provided an apparatus by means of which one or more materials may be dispensed in measured quantities. Although I have disclosed an exemplary embodiment of my invention herein for purposes of illustration, it will be understood that I do not desire to be limited specifically to such an embodiment since various changes, modifications and substitutions may be incorporated therein without necessarily departing from the spirit of the invention. Accordingly, I hereby reserve the right to all such changes, modifications and substitutions as properly come within the scope of my invention as set forth in the appended claims.

I claim as my invention:

1. In an apparatus of the character described, the combination of: a plurality of sources of material; means associated with each of said material sources for dispensing material therefrom; a receiver for the material dispensed by said dispensing means; an electrical circuit associated with each of said dispensing means; a device in each of said circuits for actuating the dispensing means associated therewith; a normally open switch in each of said circuits; means for closing and subsequently opening said switches in sequence so as to energize and subsequently de-energize said actuating devices in sequence, whereby said dispensing means dispense quantities of material from said material sources in sequence; means for rendering said switch-closing means inoperative upon closure of each of said switches; a plurality of concentric annular members corresponding in number to the number of dispensing means, said annular members being relatively rotatable about a common axis and being of progressively increasing diameters; a light source on each of said annular members, said light sources being adapted to be spaced apart along a circular path by relative rotation of said annular members; photoelectric means; means movable along said path for causing light from said light sources to fall upon said photoelectric means in sequence; means responsive to the quantity of material in said receiver for moving said last-named means along said path at rates proportional to the rates at which material is dispensed by the respective dispensing means; and means controlled by said photoelectric means for rendering said switch-closing means operative whenever light from one of said light sources falls upon said photoelectric means so that the dispensing means associated therewith delivers a predetermined quantity of material into said receiver.

2. An apparatus as set forth in claim 1 including means for rotating said annular members so as to vary the positions of said light sources on said path.

3. An apparatus as set forth in claim 2 wherein said means for rotating said annular members comprises a handle carried by each of said annular members.

4. In an apparatus of the character described, the combination of: a plurality of material dispensing devices; a plurality of concentric, annular members corresponding in number to the number of material dispensing devices, said annular members being relatively rotatable about a common axis and being of progressively increasing diameters; a control device on each of said annular members, said control devices being shiftable along a circular path by rotation of said annular members; means governed by said control devices for actuating and subsequently de-actuating said dispensing devices in sequence, said actuating and de-actuating means including an element which is movable along said path at rates corresponding to the rates at which material is dispensed by the respective dispensing devices and which is adapted to register with successive ones of said control devices; and means for rotating said annular members so as to shift said control devices along said path.

5. In an apparatus for controlling a plurality of material dispensing devices, the combination of: means for actuating the dispensing devices in sequential order; a plurality of concentric, annular members corresponding in number to the number of dispensing devices, said annular members being relatively rotatable about a common axis and being of progressively increasing diameters; a light source carried by each of said annular members, said light sources being adapted to be spaced along a circular path by rotation of said annular members; photoelectric means; means movable along said path at rates proportional to the rates at which material is dispensed by the respective dispensing devices for causing light from said light sources to fall upon said photoelectric means in sequential order; and means controlled by said photoelectric means for de-actuating each dispensing device as light from the light source corresponding thereto falls upon said photoelectric means.

6. An apparatus as set forth in claim 5 including means for rotating said annular members so as to shift said light sources along said path, said last-named means comprising a handle on each of said annular members.

7. In an apparatus of the character described, the combination of: a plurality of concentric, annular members which are relatively rotatable about a common axis and which are of progressively greater diameters; a light source carried by each of said annular members, said light sources being shiftable along a circular path by rotation of said annular members; photoelectric means; and means movable along said path for conducting light from said light sources to said photoelectric means.

8. An apparatus as set forth in claim 7 wherein said light-conducting means includes an arm which is rotatable about the axis of rotation of said annular members and which includes a material having the characteristic of conducting light along an irregular path, said arm registering at one end with said photoelectric means and having at its other end a plurality of fingers which are adapted to register with said light sources, respectively.

9. An apparatus according to claim 7 wherein one of said annular members is provided with indicia thereon defining a scale and wherein an adjacent one of said annular members is provided with an indicium thereon which is movable along said scale during relative rotation of said one annular member and said adjacent annular member.

10. In an apparatus of the character described, the combination of: a stationary, circular member; an annular member carried by and encircling said stationary member and rotatable relative thereto; a light source carried by said annular member and movable along a circular path during rotation of said annular member with respect to said stationary member; photoelectric means; and means movable along said path for conducting light from said light source to said photoelectric means.

11. An apparatus as set forth in claim 10 wherein said stationary member is provided with indicia thereon defining a scale and wherein said annular member is provided with an indicium thereon which is movable along said scale during rotation of said annular member with respect to said stationary member.

12. In an apparatus of the character described, the combination of: a stationary, circular member; a first annular member carried by and encircling said stationary member and rotatable relative thereto; a second annular member encircling and carried by said first annular member and rotatable relative thereto; a light source on each of said annular members, said light sources being shiftable along a circular path by rotating said annular members; photoelectric means; and means movable along said path for conducting light from said light sources to said photoelectric means.

13. An apparatus according to claim 12 wherein said stationary member and said first annular member are provided with indicia thereon defining first and second scales, respectively, said first annular member being provided with an indicium thereon which is movable along said first scale during rotation thereof relative to said stationary member, and said second annular member being provided with an indicium thereon which is movable along said second scale during relative rotation of said first and second annular members.

14. An apparatus as set forth in claim 13 including means on said first and second annular members for manually rotating said first and second annular members.

15. An apparatus as set forth in claim 12 wherein said light-conducting means is rotatable about the axis of rotation of said first and second annular members and includes means having the characteristic of transmitting light along an irregular path, said light-conducting means registering at one end with said photoelectric means and having at its other end means which are adapted to register with said light sources on said first and second annular members.

16. In an apparatus of the character described, the combination of: a plurality of concentric, annular members of progressively greater diameters relatively rotatable about a common axis; a plurality of control devices carried by said annular members, respectively, the relative positions of said control devices varying upon relative rotation of said annular members; a plurality of operating circuits; and means controlled by said control devices for closing and opening said operating circuits in sequence, including an element rotatable about said common axis of said annular members and registering with said control devices in sequence.

17. An apparatus as defined in claim 16 wherein said control devices are light sources, wherein said means for closing and opening said operating circuits includes switching means and photoelectric means for actuating said switching means, and wherein said rotatable element includes means for conveying light to said photoelectric means from said light sources in sequence.

18. In an apparatus of the character described, the combination of: a plurality of concentric, annular members of progressively greater diameters relatively rotatable about a common axis; a light source carried by each of said members, said light sources being shiftable along a circular path upon rotation of said members; photoelectric means; and means movable along said path for conveying light from said light sources to said photoelectric means.

19. An apparatus as defined in claim 18 wherein said light-conveying means includes an arm which is rotatable about the axis of rotation of said members and which includes a material having the characteristics of conducting light along an irregular path, said arm registering at one end with said photoelectric means and being adapted to register at its other end with said light sources.

20. In an apparatus of the character described, the combination of: a plurality of concentric, annular members of progressively greater diameters relatively rotatable about a common axis; and light sources carried by said members, respectively, said light sources being shiftable along circular paths upon rotation of said members.

21. An apparatus as defined in claim 18 wherein each of said annular members, excepting the smallest, is rotatably mounted on a smaller one of said annular members.

22. An apparatus as defined in claim 20 including an arm rotatable about the axis of rotation of said annular members, said arm being provided at its outer end with a plurality of radially spaced fingers respectively movable along said paths, said fingers and said arm including material having the characteristic of conducting light along an irregular path.

WALTER E. SAXE.

References Cited in the file of this patent
UNITED STATES PATENTS

| Number | Name | Date |
|---|---|---|
| Re. 20,141 | Bliss | Oct. 27, 1936 |
| 848,280 | Beckwith | Mar. 26, 1907 |
| 1,356,505 | Sperry | Oct. 19, 1920 |
| 2,009,209 | Scantlebury | July 23, 1935 |
| 2,071,284 | Hyland | Feb. 16, 1937 |
| 2,081,827 | Lohe | May 25, 1937 |
| 2,254,932 | Bryce | Sept. 2, 1941 |
| 2,290,278 | Failla | July 21, 1942 |